Fig. 1

Oct. 2, 1956     F. P. GOOCH     2,765,021
RING FORMING MACHINE Filed Dec. 17, 1952     8 Sheets-Sheet 2

FIG. 2

INVENTOR.
FREDERIC P. GOOCH
BY
Ostrolenk & Faber
ATTORNEYS

Oct. 2, 1956    F. P. GOOCH    2,765,021
RING FORMING MACHINE
Filed Dec. 17, 1952    8 Sheets-Sheet 5

INVENTOR.
FREDERIC P. GOOCH
BY
Ostrolenk r Faber
ATTORNEYS

Oct. 2, 1956    F. P. GOOCH    2,765,021
RING FORMING MACHINE
Filed Dec. 17, 1952    8 Sheets-Sheet 6

FIG_10_

INVENTOR.
FREDERIC P. GOOCH
BY
ATTORNEYS

Oct. 2, 1956 F. P. GOOCH 2,765,021
RING FORMING MACHINE

Filed Dec. 17, 1952 8 Sheets-Sheet 7

FIG_11_

INVENTOR.
FREDERIC P. GOOCH
BY
Ostrolen & Faber
ATTORNEYS

Oct. 2, 1956           F. P. GOOCH           2,765,021
RING FORMING MACHINE Filed Dec. 17, 1952           8 Sheets-Sheet 8

INVENTOR.
FREDERIC P. GOOCH
BY
Ostrolenk + Faber
ATTORNEYS

United States Patent Office 2,765,021
Patented Oct. 2, 1956

2,765,021

RING FORMING MACHINE

Frederic P. Gooch, Media, Pa., assignor to I-T-E Circuit Breaker Company, Philadelphia, Pa.

Application December 17, 1952, Serial No. 326,515

4 Claims. (Cl. 153—54)

My invention relates to a ring forming machine and more particularly to a machine which can round out and flatten rings by means of rollers.

In the manufacture of jet engined frames, or the like, it is necessary to employ thin metal sections to achieve lightness and strength.

In order to give this construction some rigidity, it is necessary to place ring flanges at intervals along the longitudinal axis of the casing. The rings approaching these flanges are made according to (1) drop hammer, (2) hydraulic forging press, or (3) rolled up and welded.

My invention relates to the sizing and flattening of rings which are formed by the latter method. By this latter method, the flange is rolled up and the abutting ends are welded together, usually on a device which is known as a flash welder.

In order to insure that the ends to be welded are in abutment, it is frequently necessary to flatten the ring in the area adjacent the abutting ends. As the rings are removed from the flash welder, they are under size, out of round and are not flat and therefore, not in a condition to be machined.

The prior art method to bring these rings to proper size, roundness and flatness has been by means of a forming tool which is operated by a hydraulic press. By this means, a circular die is placed within the ring and hydraulic means cause it to expand radially to thereby engage the ring and force it to conform to the configuration of the die. However, this method proved impractical since it not only requires large and expensive material such as a hydraulic press but it also requires a special die for each size ring.

Furthermore, the accuracy to which the ring can be conformed to a perfect circle was limited to the accuracy and tolerance of the die. Hence, the inherent limitations in the perfection of a circular die resulted in a ring which had, therefore, the same imperfection.

I propose to replace the die by a plurality of sizing rollers. These rollers will be spaced around a peripheral surface on the platform of the ring forming machine, and will have (1) rotation about their own axis and (2) controlled radial movement.

The ring is placed on the table of the machine and will form a circle which is larger in diameter but concentric with the circles formed by the sizing rollers.

By hydraulic means and link mechanism, each roller will be simultaneously guided in a radial path outwardly toward the ring. That is, the powered sizing rollers are moved outwardly by means of a hydraulic cylinder operated through a toggle linkage to stretch the flash welded ring to the required diameter. Since the sizing rollers are rotating in the same direction, the welded ring will be caused to rotate by the rollers.

Furthermore, the force imparted to the ring due to the outward movement of the sizing rollers will cause plastic flow in the ring, thereby permitting it to assume the perfect circle formed by the rollers.

It has been found that an accuracy of ±0.0250 inch can be achieved by this roller method of ring forming as compared with ±0.0625 of an inch achieved by the die method of ring forming. It will thus be apparent that there is no inherent limit to the accuracy with which the rings can be formed.

My machine is also provided with means whereby the minimum and maximum diameter of the circle formed by the rings before and after ring forming can be made adjustable to accommodate different sized rings.

Generally, the diameter of the ring which is to be sized on this type of machine will range on 20" to 42". Thus, by prearranging the initial radial position of the sizing rings, it is possible to form rings of any diameter with the same movement of the hydraulic cylinder.

As heretofore noted, the rings which come from the flash welder are not only out of size and roundness but frequently are not flat and therefore means have to be provided to insure that the entire ring was located in one plane.

With my roller type ring forming machine, I provide additional means which will insure the flatness of the ring while it is being formed to the proper size and roundness. The radial guided housing for the sizing roller contains a bottom flattening roller with additional means provided whereby a set of hold down rollers engage the upper surface of the welded ring.

Thus, while the ring is being rotated by the powered sizing rollers to cause plastic flow and permit it to form a circle, the flattening rollers and the hold-down rollers are engaging the upper and lower surfaces respectively thereof. Hence, the operation of rounding out and flattening is performed simultaneously.

A modification of my invention eliminates the necessity for the hold-down rollers. This is achieved by providing tapered sizing rollers. Since the rings which are being worked on weigh from 40 to 50 lbs., their weight will be sufficient to wedge them on to the lower portion of the tapered sizing rollers and thereby flatten the welded rings while it is being rounded out without the need of hold down rollers.

The primary object of my invention is to provide a ring forming machine which requires no die.

Another object of my invention is to provide a ring forming machine which will simultaneously round out and flatten a welded ring.

A still further object of my invention is to provide a device to bring welded rings to the proper size roundness and flatness by means of sizing and flattening rollers.

A still further object of my invention is to provide a ring forming machine which is readily adjustable for welding rings which have a wide range of diameters.

A still further object of my invention is to provide a plurality of power driven sizing rollers whose radial movement can be controlled to cause plastic flow in a welded ring to permit it to form a circle.

A still further object of my invention is a ring forming device which has no inherent limitation on the accuracy of the ring to be formed.

Another object of my invention is a ring forming machine with tapered sizing rollers which can perform the task of rounding out and flattening a ring simultaneously without the necessity of hold-down rollers.

A still further object of my invention is a ring forming machine having sizing rollers which are moved outwardly by means of a hydraulic cylinder which operates through a toggle linkage to stretch welding ring to a required diameter.

These and other objects of my invention will be apparent from the following description when taken in connection with the drawings in which.

Referring now to the figures, the hydraulic unit 10 and the electric motor 12 is supported in the back of housing 11. The hydraulic means 10 and the electric motor 12 represent only the energy input into the ring forming machine. The hydraulic mechanism 10 operating through piston 13 controls the movement of extension arms 15a and 15c. Piston 13 is connected to the extension arms 15a and 15c through the hollow disc 20. The inside ends of the extension members 15a and 15c are pivotally attached at 22a and 22c. The outer end of the extension arms 15 are attached by pivotal connections 23 to a first guided slide member 25. A second guided slide member 50 is connected to the first guided member 25 by means of rod 30. The guided members 25—50, hereinafter more fully described, are mounted within radial guide members 27. Guided slide members 50 serve as a support in which the sizing rollers 28 are rotatably mounted.

Figure 2:
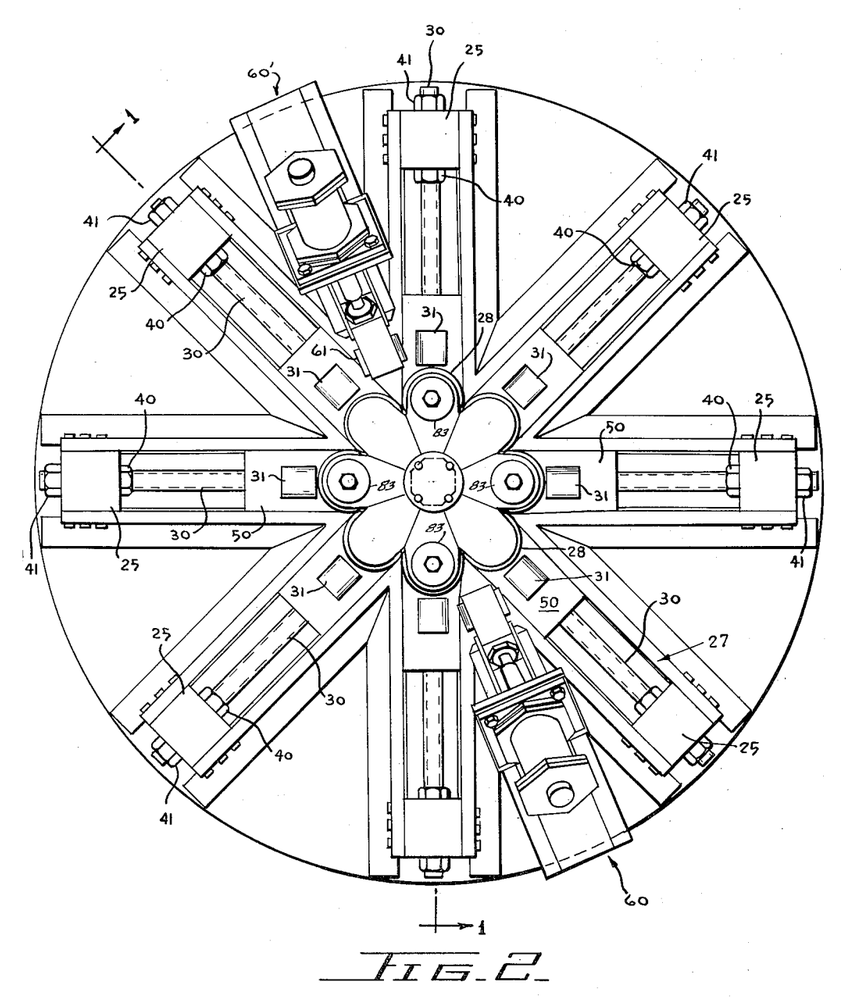
Figure 2 is a top view of the novel ring forming machine seen in Figure 1.

As best seen in Figure 2, the ring forming machine is provided with a plurality of sizing rollers 28 and guided members 25—50. The plurality of guided members 25—50 extend radially in the machine and thus, the sizing rollers 28 located on the interior ends thereof, form a concentric circle with the outside diameter of the machine.

It will be noted that the ring 100 to be formed is positioned around the circle formed by the sizing rollers 28 which causes plastic flow in the ring when the sizing rollers 28 are moved radially outward by the guided members 50. That is, upward movement of the piston 13 due to the hydraulic member 10 will cause a hollow disc 20 to move upwardly.

Figures 3, 4, 5:
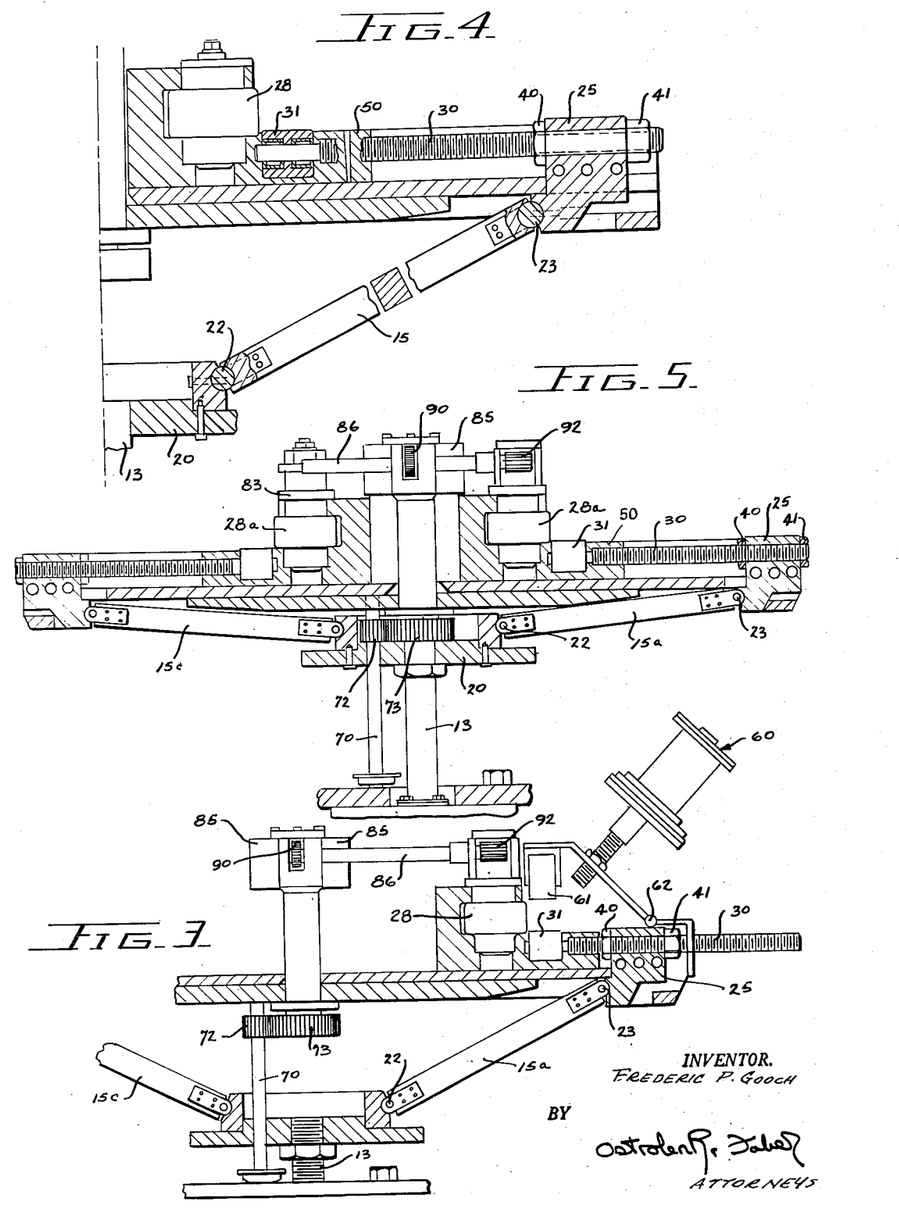
Figure 3 is a sectional view of the portion of the ring forming machine of Figure 1 showing the sizing rollers in position for large rings.
Figure 4 shows the position of a control arm for the sizing rollers before the ring is formed.
Figure 5 shows the position of the control arm after the ring is formed.

Thus, due to the pivotal connection between the connection arms 15 and the hollow disc 20, guided members 25—50 will be forced radially outward as seen by the comparison of Figures 4 and 5. Since sizing rollers 28 are rotatably mounted on the guided members 50, outward radial movement will be imparted thereto.

The guided members 50 are provided with a shaft 30 on which guide rollers 31 are rotatably mounted. Thus, when the ring to be formed is positioned concentric with the plurality of sizing rollers 28, it will rest on the guide rollers 31 to insure that the ring will be flat and also to substantially reduce the friction between the ring and the machine.

The rod 30 on which the guide rollers 31 are rotatably mounted extends through an opening in one end of the guided member 25.

As best seen in Figure 4, the rod 30 is threaded at its left end and secured to the guided member 25 by means of nuts 40 and 41.

Thus, it will be apparent that an upward movement of the piston 13 due to the hydraulic unit 10 will cause the extension arm 15 to move from the position of Figure 3 or 4 to the position of Figure 5. That is, the pivot end 23 of the extension arm 15 will be moved radially outward. This movement will be transmitted to the guided member 25 and cause the same to move radially outward.

In view of the fact that the shaft 30 is rigidly secured to the guided member 25 by means of the nuts 40 and 41, the guided member 25 will transmit its motion through the shaft 30 to the guided member 50. The guided member 50 which forms a support for the guide rollers 31 and the sizing rollers 28 will therefore move these two members 28—31 forward from the position of Figure 4 to the position of Figure 5.

Accordingly, it will be noted that the vertical motion of the piston 13 is transmitted to horizontal motion of the sizing roller 28 and guide roller 31 through the extension arm 15.

Due to the pivot link arrangement at 22 and 23 for the connection of the extension arm 15 to the hollow disc 20 and the guided member 25, the initial upward movement of the piston 13 and hollow ring 20 will result in rapid radial movement of the guided member 25 and its associated parts. However, near the end of the upward stroke, when the extension arm 15 is substantially horizontal, the guided member 25 will not be moved the same distance for a predetermined movement of the piston 13 and its hollow disc 20.

Thus, on the initial movement of the piston 13, the sizing rollers 28 will move rapidly toward the ring 100. However, near the end of the upward stroke of the unit 10—13—20, when the sizing roller 28 is in engagement with the ring 100, it will be moved radially outward at a slower speed to thereby permit a substantial gradual plastic flow of the ring.

Accordingly, by providing a pivot extension arm 15 as a means for transmitting the vertical motion of the piston 13 to horizontal motion of the sizing rollers 28, it is possible to obtain a mechanical advantage which approaches infinity when the arm 15 is perpendicular to the hollow disc 20. Thus, with this arrangement, the above noted movement of the sizing rollers 28 will be obtained. That is, the sizing rollers 28 will initially move at rapid speed radially outward toward the ring 100 and near the end of the stroke will be moving slowly radially outward when in engagement with the ring 100 to thereby permit a gradual rounding out thereof due to plastic flow.

As will hereinafter be more fully described, a separate and independent drive means is provided for the disc rollers 28 to permit them to rotate about their own axis. Hence, when the sizing rollers 28 are moved radially outward into engagement with the ring resting on the guide rollers 31, their rotational movement about their own axis will impart motion to the ring and cause it to rotate. The rotatable mounting of the guide rollers 31 on the shaft 30 will form a substantially frictionless base on which the ring can rotate.

It will be further noted that irrespective of the initial position of the guided member 50, which contains the sizing rollers 28 and the guide rollers 31, a predetermined movement of the piston 15 and its associated extension arm 15 will result in a predetermined movement of the two rollers 28 and 31. Thus, for example, when it is required that the machine round out a ring having a relatively small diameter, for example about twenty inches, the guided member 50 and its associated rollers 28, 31 will be in the position indicated in Figures 1 and 4.

In the event that it is desired to round out a ring having a larger diameter, for example forty-two inches, means are provided whereby the guided member 50 and its associated rollers 28 and 31 may be moved forward for their initial setting. Thus, in the forward position, even though the piston 13 and its associated extension arm 15 will impart only a predetermined radial movement thereto, the movement will be sufficient to enable the sizing roller 28 to engage the ring and round it out by plastic flow.

The adjustment of the initial position for the sizing rollers 28 is achieved by means of the shaft 30. Thus, when it is necessary to move the sizing rollers 28 from the position of Figure 4 to the position of Figure 3, the nut 40 is manually moved to the left of the shaft 30 by threaded engagement between the threads thereon. The entire shaft 30 may then be manually moved to the right until the sizing roller 28 is in its proper radial position. At this point, the nut 40 is threadably moved to the right until it engages the left edge of the guide block 28 and the nut 40 is threadably moved to the left on the shaft 30 until it engages the right side of the guided member 25. The shaft 30 will then be secured with respect to the guided member 25 and a proper initial position of the sizing rollers 28 will be achieved. The position of the various components after this adjustment is as seen in Figure 3.

In the operation of my novel ring forming machine, it is possible to simultaneously achieve two objectives, namely that of rounding out the ring so that it is of the proper size roundness and will simultaneously flatten the welded ring so that it lies in one plane. One means of insuring that the welded ring which is to be rounded out will also be flattened in the single forming operation is to provide hold-down units 60 and 60' which will be provided with hold-down rollers 61.

Figure 1:
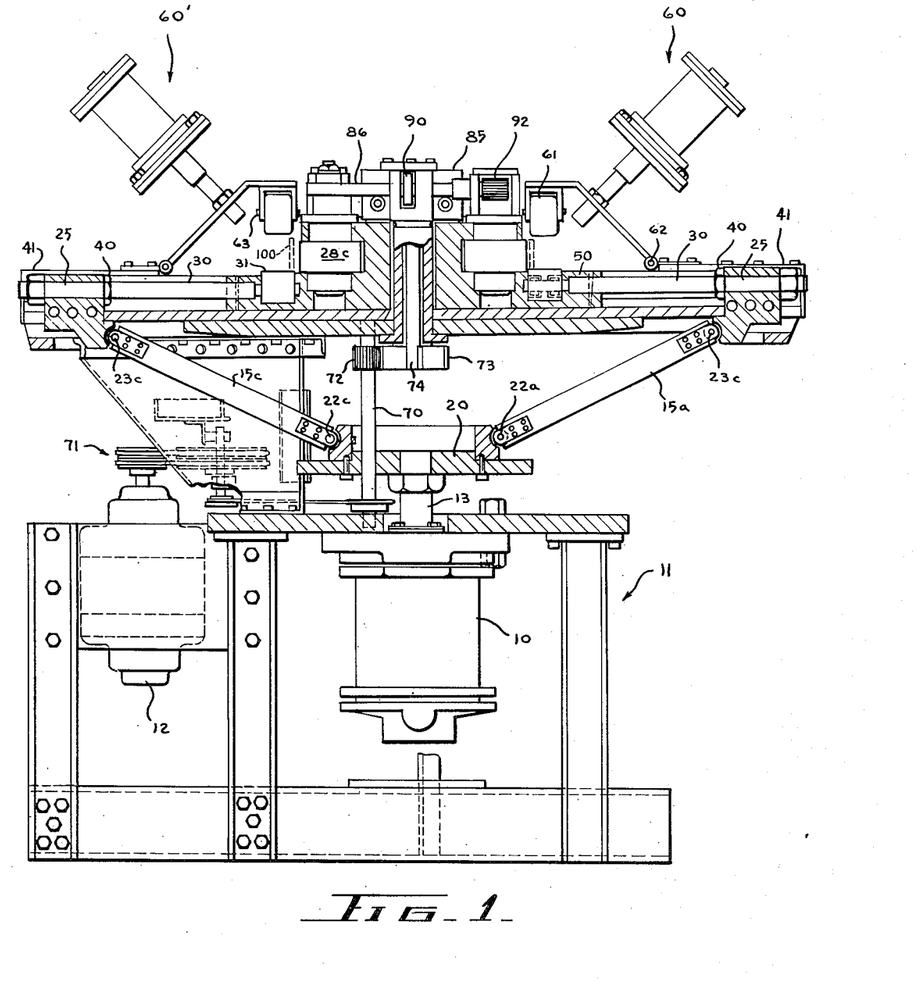
Figure 1 is a side cross-sectional view of my novel ring forming machine and taken along the line 1—1 of Figure 2.

The hold-down unit is pivoted at 62. The unit 60 may be rotated about its pivot 62, as seen in Figures 1 and 3, clockwise and the hold-down unit 60' may be pivoted counterclockwise in order to enable the operator to position the ring 100, which is to be formed concentric with the sizing rollers 28.

After the ring 100 is properly positioned on the ring forming machine, the hold-down units 60 60' may then be rotated about their pivot point 62 so that their hold-down rollers 61 are in engagement with the upper surface of the ring and in vertical alignment with the guide rollers 31.

The units 60 and 61 are made with sufficient weight en masse so that a ring 100 which may be of the order of fifty or sixty pounds will be urged downwardly.

Although the hold-down rollers 61 are rotatably mounted on the pin 63, these units will be instrumental in urging the ring 100 downwardly even though there is relative motion therebetween.

Hence, as the sizing rollers 28 move radially outward to engage the ring and urge it to perfect roundness by plastic flow thereof, the hold-down rollers 61 will be urging the ring downwardly toward the guide rollers 31 thereby insuring that it will be flattened during the rounding operation.

It will be noted that the flattening operations of the ring to be rounded can be performed by the hold-down units 60 and 60' as above described or may be performed by tapered sizing rollers which form one modification of my invention.

With this modification, the hold-down units 60 and 60' are eliminated and the sizing rollers 28 are tapered so that their lower portion has a larger diameter than their upper portion.

Hence, when the ring 100 is positioned concentric with the rollers 28, its weight will be sufficiently great to urge it downwardly to the enlarged portion of the tapered roller and result in flattening thereof.

As heretofore noted, means are provided for imparting (1) radial movement to the sizing rollers 28 and (2) rotational movement of the sizing rollers 28 about their longitudinal axis.

The radial movement of the sizing rollers 28 has heretofore been described in connection with the hydraulic mechanism 10 operating through piston 13, extension arm 15, guided member 25 to guided member 50 and rollers 28 and 31. The control of the sizing rollers for imparting rotational movement about their longitudinal axis will now be described.

The electrical motor 12 controls the rotation of the shaft 70 by means of pulley and belt arrangement 71, as seen in Figure 1. The shaft 70 which extends through the hollow portion of the piston disc 20 is provided with a gear 72 which is integrally attached to its upper end.

The gear 72 meshes with mating gear 73 which is integrally secured to the lower end of shaft 74, as seen in Figures 1, 3, 5 and 11. Thus, the rotational movement of the motor 12 is transmitted to the pulley and belt mechanism 71 to the shaft 70 which imparts rotational movement to the shaft 74 through the mating gears 72 and 73.

Figure 8:
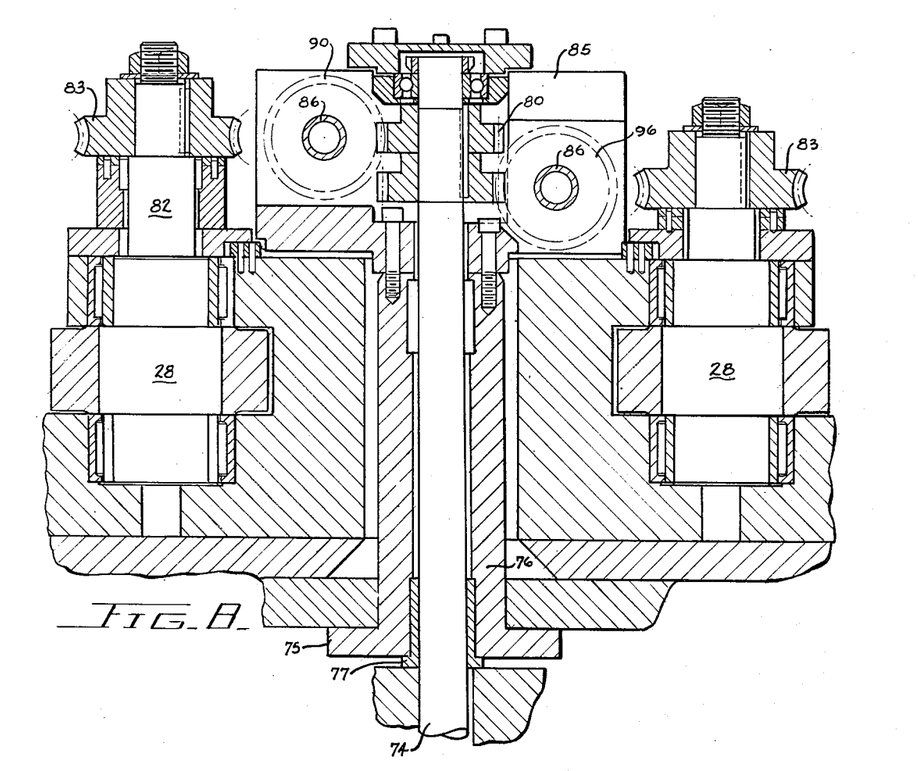
Figure 8 is a view taken along the line 8—8 of Figure 6.
Figure 9:
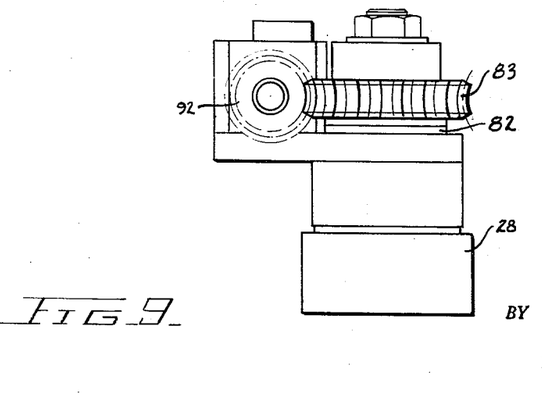
Figure 9 is an enlarged view taken along the line 9—9 of Figure 6.
Figure 11:
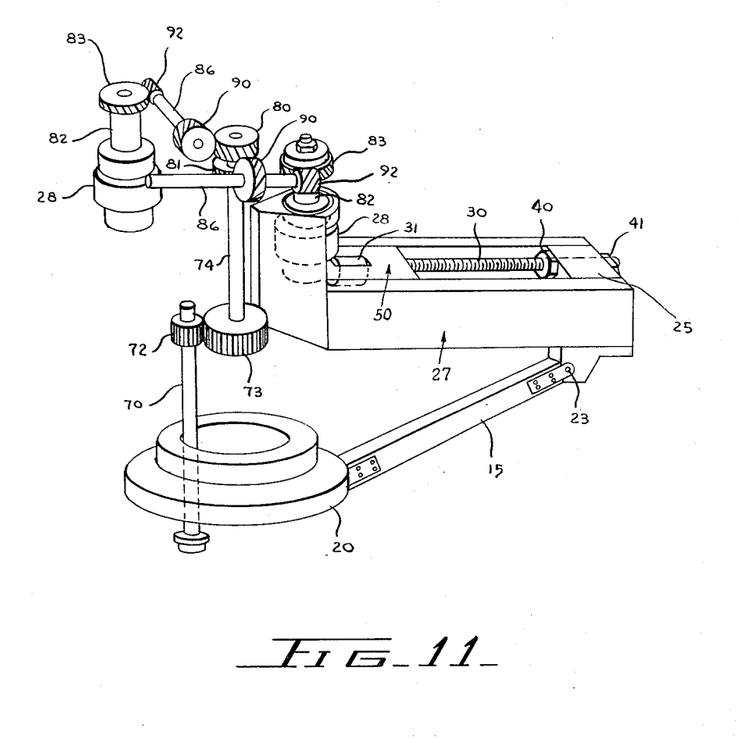
Figure 11 is a perspective view of the drive mechanism and positioning mechanism for the sizing rollers.

The shaft 74 which is positioned within the housing 75 and 76 is provided with bushings 77 and 78, as seen in Figure 8, to permit rotation therein. The upper end of the shaft 74 is provided with a series of helical gears 80 and 81, as seen in Figures 8 and 11 which are keyed thereto.

Figure 6:
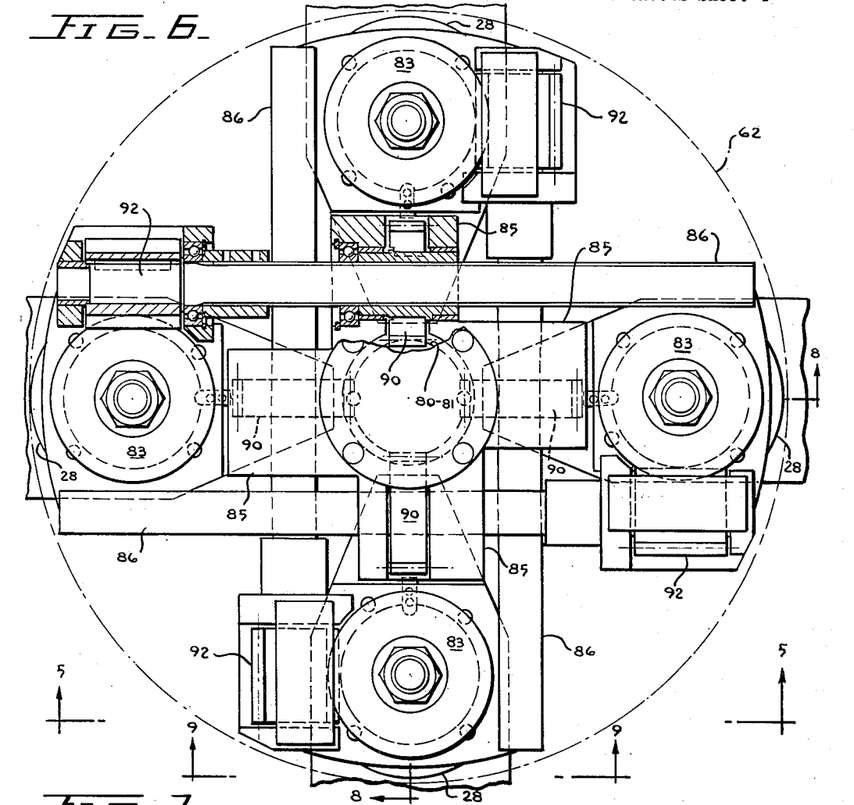
Figure 6 is a top view of a portion of the drive control mechanism for the sizing rollers.
Figure 7:
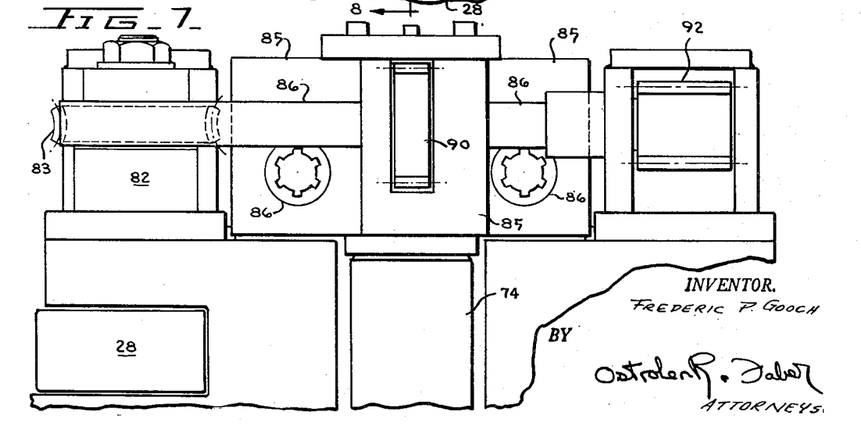
Figure 7 is a view looking in the direction of the line 7—7 of Figure 6.
Figure 10:
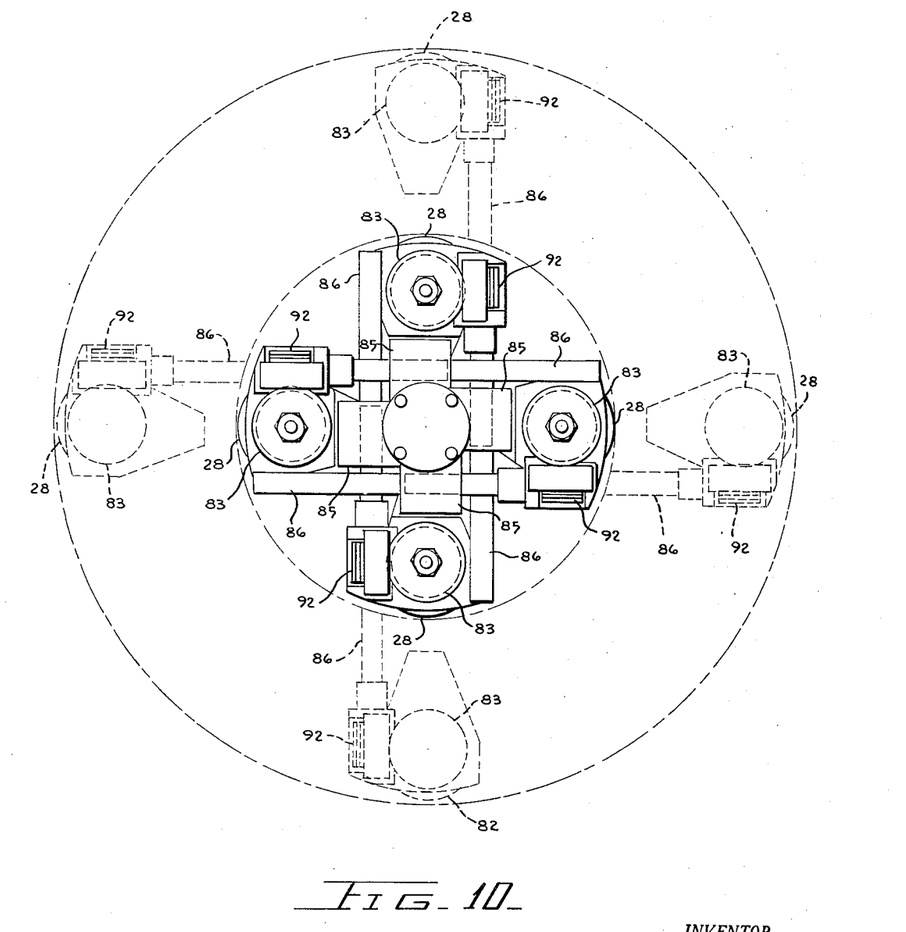
Figure 10 is a top view similar to Figure 6 of the drive control showing its relation to the sizing rollers.
Figure 12:
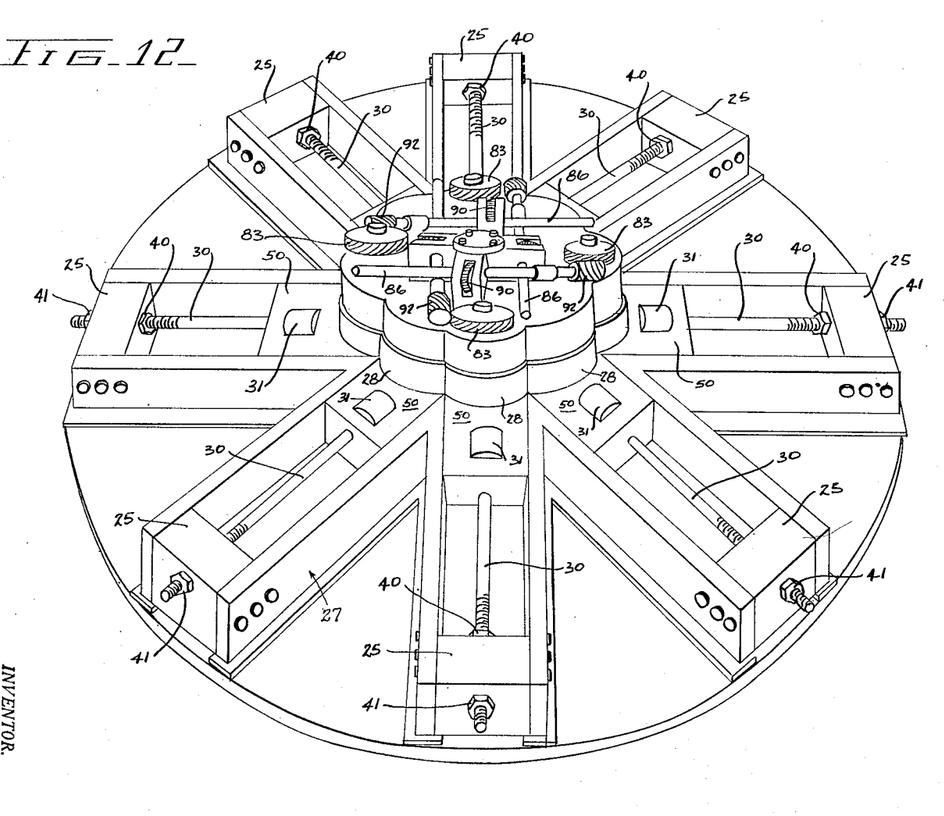
Figure 12 is a perspective view of the top of my novel ring forming machine.

Every other sizing roller 28 is provided with an upwardly extending shaft 82 which has a gear 83 integrally secured to the upper end thereof. Thus, as seen in Figures 6, 10 and 12, there will be four sizing rollers 28 which have an asociated gear 83 to permit the roller to be driven about its longitudinal axis.

A housing means 85 is provided for the helical gears 80 and 81 of the shaft 70. As seen in Figures 6, 7, 10 and 12, the housing 85 is provided with appropriate openings to support the spline shafts 86. It will be noted that each of the sizing rollers 28 which are to be driven from the shaft 74 is provided with a spline shaft 86. These shafts 86 are appropriately mounted in bushings within the housing 85 and will be driven by the helical gears 80—81, as seen in Figure 8, through the mating engagement with the gears 90 which are prevented from housing rotational movement with respect to the shaft 86 due to spline engagement between the shaft and the gear 90.

Thus, it will be noted that the shaft 86 can be moved in a direction perpendicular to the plane of the gear 90 due to the spline engagement therebetween. It will also be noted that the spline engagement will prevent rotational movement of the gear 90 with respect to the shaft 86 and thereby to permit the form to transmit rotational movement to the shaft.

A worm gear 92 is integrally secured to one end of the shaft 86 and meshes with the gear 83 which is the driving gear for the sizing rollers 28. Thus, it will be seen that the rotational motion of the electrical motor 12 can be imparted to the sizing rollers 28 by means of the mechanism described. The motion is transmitted as follows: from the motor 12 which rotates main control shaft 74 in a manner heretofore described, through the helical gears 80, through gear 90, the shaft 80, the worm gear 92, to the gear 83 and through the shaft 82 to the sizing rollers 28.

It will be noted that the spline engagement between the shaft 86 and its driving gear 90 will permit the shaft 86 to be moved in a direction perpendicular to the gear so that its worm gear 92 will be in engagement with the sizing roller gear 83 when these rollers are in an initial position for small rings, as seen in Figure 4, or in an initial position for large rings, as seen in Figure 3.

Accordingly, I have disclosed a novel ring forming machine wherein:

1. A series of sizing rollers are used to round out a ring in which the tolerance of roundness can be obtained between ±0.0250 of an inch as compared with ±0.0625 of an inch as achieved with the prior art ring forming machine which used a die to round out the rings;

2. It is possible to rapidly and easily adjust the initial position of the sizing rollers so that the machine can be adapted for rounding out any size ring;

3. Hold-down rings are provided to insure that the ring will be urged toward guide rollers so that the ring may be flattened while it is being properly rounded out;

4. Separate and independent drive means are provided for the sizing rollers so that they will have rotational movement about their own axis and thereby cause the ring to rotate while it is being rounded out;

5. The driving means provided for the rotation of the sizing rollers can be rapidly and easily adjusted to be in bushing engagement with the gear of the sizing rollers irrespective of its initial position; and 6. The radial movement of the sizing rollers has an initial fast velocity and a subsequent slow velocity at the end of the stroke due to an extension arm connection which changes from a medium mechanical advantage to an infinite mechanical advantage when the arm is perpendicular to its controlling piston.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a ring forming machine comprising a plurality of sizing rollers, a hydraulic cylinder, a toggle linkage, radial guide members, first and second guided slide members, said first and second guided slide members being operatively connected to move in unison, said toggle linkage comprising in part said first slide member; a first means including said toggle linkage connecting said hydraulic cylinder to said second guided slide members for transmitting motion to said sizing rollers; there being one of said second guided slide members for each of said sizing rollers; said sizing rollers being rotatably mounted on said second guided slide members; said sizing rollers and said first and second guided slide members mounted in said guide members, a second means to individually adjust said sizing rollers and second guided slide members with respect to their associated first guided slide member, power means operatively connected to said sizing rollers for rotating said sizing rollers about their own axis.

2. In a ring forming machine comprising a plurality of sizing rollers, a hydraulic cylinder, a toggle linkage, radial guide members, first guided slide members and second guided slide members; said first and second guided slide members being operatively connected to move in unison; there being one said toggle linkage for each of said sizing rollers; said toggle linkage comprising in part said first guide member, means including said toggle linkage connecting said hydraulic cylinder to said second guided slide members for transmitting motion to said sizing rollers; there being one of said second guided slide members for each of said sizing rollers; said sizing rollers being rotatably mounted on said second guided slide members; said sizing rollers and said first and second guided slide members mounted on said guide members, means to individually adjust said sizing rollers and said second guided slide members with respect to their associated first guided slide member; power means operatively connected to said sizing rollers for rotating said sizing rollers about their own axis, said rotational motion of said sizing rollers being imparted to the ring to be formed.

3. In a ring forming machine comprising a plurality of sizing rollers, a hydraulic cylinder, a toggle linkage, radial guide members, first and second guided slide members, said first and second guided members being operatively connected to move in unison; there being one said toggle linkage for each of said sizing rollers; said toggle linkage comprising in part said first guided slide member, means including said toggle linkage connecting said hydraulic cylinder to said second guided slide members for transmitting motion to said sizing rollers; there being one of each of said first and second guided slide members for each of said sizing rollers; said sizing rollers being rotatably mounted in said second guided slide members; said sizing rollers and said first and second guided slide members mounted on said guide members, means to individually adjust said sizing rollers and second guided slide members with respect to their associated first guided slide member; power means operatively connected to said sizing rollers for rotating said sizing rollers about their own axis, said rotational motion of said sizing rollers being imparted to the ring to be formed; a guide roller rotatably mounted on each of said second guided slide members and associated with each of said sizing rollers; said guide rollers positioned to form a substantially frictionless base for the ring rotated by said sizing rollers.

4. In a ring forming machine comprising a plurality of sizing rollers, a hydraulic cylinder, a plurality of sub-assemblies being comprised of toggle linkages, a radial guide member, a first guided member, a second guided member; said first and second guided members being operatively connected to move in unison; said toggle linkages comprising in part said first guided member; one end of said toggle linkages being pivotally connected to said hydraulic cylinder, the other end of said toggle linkages being operatively connected to said second guided member; one of said sizing rollers associated with each of said sub-assemblies and being rotatably mounted on said second guided member; said hydraulic cylinder operatively connected to said plurality of guided members and sizing rollers through their respective toggle linkages to simultaneously transmit motion to said sizing rollers; each of said guided members being operatively positioned to be slidably mounted within its respective said guide member; means to effectively modify the length of said toggle linkages to adapt said ring forming machine for various diameter rings; power means operatively connected to said plurality of sizing rollers for rotating said plurality of sizing rollers about their respective axis; said plurality of sizing rollers being positioned circumferentially about said ring forming machine; said circumferentially positioned sizing rollers imparting rotational motion to a ring to be formed by said ring forming machine when said sizing rollers are driven by said power means.

References Cited in the file of this patent

UNITED STATES PATENTS

| 800,764 | Rigby | Oct. 3, 1905 |
| 1,368,890 | Canfield | Feb. 15, 1921 |
| 1,419,929 | Jackson | June 20, 1922 |
| 1,536,498 | Horvath | May 5, 1925 |
| 2,429,052 | Forbes | Oct. 14, 1947 |
| 2,612,204 | Rickhoff et al. | Sept. 30, 1952 |

FOREIGN PATENTS

| 800,764 | Great Britain | Oct. 3, 1905 |